United States Patent
Salamon et al.

[11] Patent Number: 5,380,387
[45] Date of Patent: Jan. 10, 1995

[54] LENS BLOCKING/DEBLOCKING METHOD

[75] Inventors: Peter A. Salamon, Hebron; JoAnn DeMarco, Wethersfield, both of Conn.

[73] Assignee: Loctite Corporation, Hartford, Conn.

[21] Appl. No.: 264,831

[22] Filed: Jun. 23, 1994

Related U.S. Application Data

[63] Continuation-in-part of Ser. No. 127,286, Sep. 27, 1993, abandoned, which is a continuation of Ser. No. 959,209, Oct. 13, 1992, abandoned.

[51] Int. Cl.$^6$ ............................................. B32B 31/00
[52] U.S. Cl. ........................................ 156/154; 156/344; 156/275.5; 156/275.7; 156/330.9; 156/331.7; 156/289; 451/390; 451/42; 451/289
[58] Field of Search ............... 156/154, 344, 272.2, 156/275.5, 275.7, 330.9, 331.7, 289; 522/96, 99, 103, 182; 51/216 LP, 284 R, 131.5

[56] References Cited

U.S. PATENT DOCUMENTS

| | | | |
|---|---|---|---|
| 2,434,614 | 1/1948 | Hicks | 51/303 |
| 3,404,488 | 10/1968 | Cox et al. | 51/284 |
| 4,266,996 | 5/1981 | Garbe et al. | 156/154 |
| 4,286,047 | 8/1981 | Bennett et al. | 156/330 X |
| 4,322,490 | 3/1982 | Molaire | 430/281 |
| 4,619,082 | 10/1986 | Dent et al. | 51/284 |
| 4,789,424 | 12/1988 | Fornadel et al. | 51/216 LP |
| 4,826,705 | 5/1989 | Drain et al. | 427/54.1 |
| 4,856,234 | 8/1989 | Goins | 51/216 LP |
| 5,007,975 | 4/1991 | Yamamoto et al. | 156/154 |
| 5,009,731 | 4/1991 | Yoshikawa et al. | 156/154 |
| 5,096,969 | 3/1992 | Payne et al. | 525/222 |
| 5,145,884 | 9/1992 | Yamamoto et al. | 522/14 |
| 5,150,547 | 9/1992 | Johnson | 51/216 LP |
| 5,154,861 | 10/1992 | McBrierty et al. | 264/1.4 |
| 5,177,907 | 1/1993 | Rothe et al. | 51/216 LP |

FOREIGN PATENT DOCUMENTS 3907261 9/1990 Germany.

*Primary Examiner*—Chester T. Barry
*Attorney, Agent, or Firm*—Radhika P. Raju; Edward K. Welch, II; Eugene F. Miller

[57] ABSTRACT

In a method for manufacturing ophthalmic, telescopic, microscopic, etc. lenses, the use of a radiation (e.g., UV or visible light) curable adhesive formulation containing a predominant amount of an acrylic capped organic prepolymer; a lesser amount of an ethylenically unsaturated diluent monomer; a minor amount of a non-reactive releasing agent and a suitable photoinitiator for blocking (bonding) and deblocking (debonding) a lens blank to a support member.

22 Claims, 2 Drawing Sheets a  b  c

LENS BLOCKING/DEBLOCKING METHOD

This application is a continuation-in-part of Ser. No. 08/127,286, filed on 27 Sep. 1993, now abandoned, which is a continuation of Ser. No. 07/959,209, filed on 13 Oct. 1992, now abandoned.

1. FIELD OF THE INVENTION

This invention relates to the use of a radiation (e.g., UV or visible light) curable adhesive comprising a predominant amount of an acrylic capped organic prepolymer; a lesser amount of an ethylenically unsaturated diluent monomer; a minor amount of a non-reactive release agent (especially a vinyl ester of a saturated oil acid) and a suitable photoinitiator as a blocking/deblocking adhesive in the manufacture and processing of optical lenses, including, but not limited to ophthalmic lenses, telescopic lenses, microscopic lenses and the like. Such lenses may be comprised of glass, polycarbonate or other thermosets or thermoplastics.

2. BACKGROUND OF THE INVENTION

Various methods and means have been employed to mount individual lens blanks in a blocking tool which can be detachably connected to a spindle of an abrading machine in order to generate, grind and polish a surface on the lens. Conventional procedures utilized heretofore have employed a blocking pitch or wax to adhere the lens blank to the block so that the same may be processed. Such pitches have tended to be considered more or less trade secrets in the optical industry and have varied in accordance with the type of lens and glass composition to be ground, as well as the methodology and apparatus employed in the grinding process itself. Among other things, however, conventional pitches are known to include such materials as asphalt, coal tar, pine tar, rosin, beeswax, paraffin, shellac, turpentine, etc. in different proportions. Such pitches required considerable cooking and processing whereby cooking time and/or turpentine content was varied to alter the consistency or "temper" of the pitch, particularly with respect to its flow characteristics under processing conditions. Early forms of pitch had considerable flow at temperatures of over 90–95° F. Since such temperatures are typically attained in grinding processes employing fast grinding speeds and/or significant pressure at the interface of the lens blank and the grinding element itself, more advanced, higher temperature pitches were ultimately formulated. Such pitches now attain flow temperatures of 140–200° F., and higher.

While higher temperature pitches tend to allow for faster processing speeds and grinding pressures, they inherently transfer some of this heat to the lens blank during the bonding step creating thermal gradients within the glass resulting in lens "springing" or warpage. This warpage is particularly noted and magnified in lens geometries having a diameter-to-center thickness ratios (i.e., aspect ratios) exceeding 10:1. In addition to the difficulties associated with the thermal gradients induced by such pitches, it has been found that as pitches having greater adherent capabilities were produced, it became increasingly difficult, if not impossible, to remove the finished lens from the block without damaging the lens itself due to the strength of the bond provided by the pitch. Attempts to lessen the tenacity of the pitch generally resulted in a substantial number of lenses parting from blocks during the abrading process causing irreparable damage to the lenses. Although these detriments could be overcome by further modifying the natural pitches, the so modified pitches tended to produce various other defects in the lenses such as staining, scratching and striping.

Initial efforts to overcome the difficulties associated with the use of natural pitches focused on synthetic thermoplastic resins and cellulose derivative compositions (Hicks U.S. Pat. No. 2,434,614), as well as combinations of a selectively soluble resinous material such as polyvinylacetate in conjunction with low melting point fusible alloys (Cox et al. U.S. Pat. No. 3,404,488). Furthermore, Dent et al. (U.S. Pat. No. 4,619,082) taught the use of molten waxes in conjunction with a lens blank holder for providing added support and alignment precision in the lens manufacturing process. Such molten waxes generally had melt temperatures in the range of 60–70° C.

While these latter improvements overcame some of the difficulties with the use of natural pitches, most notably the inconsistency in adhesive strength, the environmentally undesirable solvents and solutions necessary for fully removing and cleaning the pitch from the lens piece after deblocking, as well as the staining and striping noted with the use of pitches, such improved processes still subjected the lens element to thermal gradients during the blocking and deblocking processes. Furthermore, they still have the detriment of comparatively long setting time from the time at which the lens is seated on the block element and the time to which the molten adherent is sufficiently cooled to allow processing of the lens blank element.

In view of the foregoing, there continues to be a strong need and desire for the identification and development of other adhesive materials which may be used in the blocking and deblocking of lens blanks and lenses. In this respect, room temperature-hardenable adhesives, cyanoacrylate-type adhesives and two-part adhesives have been evaluated. Of these, room temperature-hardenable adhesives typically rely upon some environmental factor, most notably moisture, to initiate and bring about cure. Because these environmental factors are not readily controllable, at least not without difficulty and costly equipment, such compositions are not suitable for use as a lens blocking adhesive as there would be very little, if any, control of cure speed and bond strength. On the other hand, while cyanoacrylate-type adhesives cure instantly, because of the instant curability there is little if any time available in which to adjust the lens blank on the block element before the adhesive has fully bonded. Consequently, if the lens blank is not positioned accurately and correctly to begin with, the lens must be removed from the block element and reseated, perhaps repeatedly, until it is seated correctly. Furthermore, this type of adhesive exhibits excessively high bonding forces requiring longer deblocking times. Finally, as with any two-part adhesive, since, by definition, they require the mixing of two components to initiate cure, (which in itself is subject to variation and consequently performance variation), once the materials are mixed they must be used within a relatively short period of time due to their limited pot life. Although the pot life can be extended, it is done so at the expense of cure speed.

3. SUMMARY OF THE INVENTION

It is, therefore, an object of the present invention to provide for a room temperature blocking (bonding)

process. It is also an object of the present invention to provide an adhesive composition suitable for use in this process wherein such adhesive composition provides excellent adhesive strength to glass and metal surfaces, even at the high processing temperatures often encountered; has a relatively short cure time, but not so short as not to allow for working/positioning of the lens on the block element; does not cause a shifting or movement of the lens on the block element during cure; is curable without heat and does not cause any distortion, discoloration, staining or striping of the lens; is capable of being debonded or deblocked with minimal effort in, preferably, less than one hour; and, finally, may be removed from the lens through a simple process employing environmentally safe materials.

It has now been found that the above-identified objects may be attained by employing as the lens blocking-/deblocking adhesive a radiation curable composition comprising a predominant amount of at least one radiation curable, acrylic capped organic prepolymer resin, a lesser amount of a monofunctional ethylenically unsaturated diluent monomer, a minor amount of at least one non-reactive release agent, preferably a vinyl ester of a saturated oil acid and a suitable photoinitiator. Preferred compositions will also contain minor amounts of a monomer having plural (meth)acrylic functionality and/or a poly(alkyleneoxide) (meth)acrylate having three or more alkyleneoxide repeat units or a saturated $C_{10}$ or higher hydrocarbyl (meth)acrylate. Additionally, thickeners and thixotropes, e.g., polymethylmethacrylate and silica, especially fumed silicas, respectively, may be employed for viscosity/rheology control. Finally, such compositions may comprise conventional stabilizers, fillers, nonreactive diluents, coloring agents and the like in conventional amounts.

The aforementioned radiation curable adhesive composition is especially suitable for use in producing lenses; specifically in adhering the lens or lens blank to the support member or block for subsequent machining, polishing and/or such other necessary treatments. In particular, the present adhesive provides the advantages of (a) exhibiting no adverse effects on the lenses (e.g., springing, staining or striping); (b) being free from the problem of inaccurate positioning of the lens material with respect to the support member as the result of excessively fast or slow cure speeds; (c) exhibiting sufficient bonding force with minimal contact area to enable working, such as machining and polishing, of the lens blank while bonded to the support member, without adverse influences to the lens; (d) being readily debondable so as to separate the lens element from the support member, again without adverse influences to the lens; and (e) being controllable with respect to cure time so as to improve their utility and ease of use.

Another aspect in accordance with the practice of the present invention is an improved method for bonding a lens blank to a support member so as to enable the lens blank to be subject to working and/or treatment in the production of a commercially useable lens element. This method comprises the steps of applying the adhesive to the support member, bonding the lens blank to the support member with the adhesive applied thereon, exposing the bonded lens blank and support member to the appropriate radiation (e.g., ultraviolet, including low energy UV, or visible light) so as to harden the adhesive, subjecting the lens blank to working and/or treatment so as to form the lens blank into the desired lens element and, thereafter, separating the worked or treated lens from the support member.

Other aspects and embodiments of the present invention will be discussed in further detail in the description which follows.

4. BRIEF DESCRIPTION OF THE DRAWING

5. DETAILED DESCRIPTION OF THE INVENTION

Figure 1:
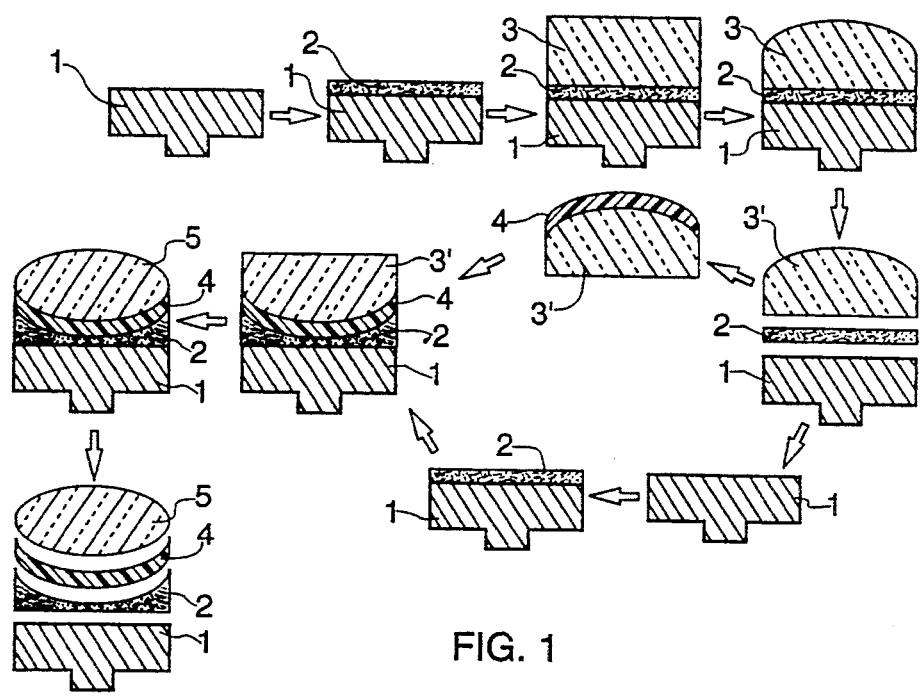
FIG. 1 is an illustrative view of some of the steps carried out in processing a lens blank into a lens itself.

The present invention provides for a radiation curable adhesive comprising a predominant amount, preferably from about 45 to about 80% by weight, of at least one (meth)acrylic capped organic prepolymer resin; a lesser amount, preferably from about 5 to 35% by weight, of a monofunctional ethylenically unsaturated diluent monomer; a minor amount, preferably no more than about 6% by weight, of a non-reactive release agent and an effective amount, generally from 0.001 to 5, preferably from 0.01 to 2, percent by weight, of a suitable photoinitiator. Of course the foregoing ranges may be varied considerably, e.g., the release agent may be used in amounts up to about 10 weight percent, so long as the objectives of the instant compositions, i.e., good adherent strength with short deblocking times, are not adversely affected.

In their most preferred embodiment, the adhesive compositions of the present invention comprise:
(a) 50–70% of at least one (meth)acrylated urethane, (meth) acrylated polyester urethane, (meth) acrylated polyepoxide, (meth)acrylated poly(alkyleneoxide), (meth)acrylated polybutadiene or mixtures thereof;
(b) 10–30% of a monofunctional ethylenically unsaturated diluent monomer;
(c) 0–3% of a monomer having plural (meth)acrylic functionalities;
(d) 0.5–5% of at least one vinyl ester of a saturated oil acid as the non-reactive releasing agent;
(e) 0–20% of a poly(alkyleneoxide) (meth)acrylate having three or more alkyleneoxide repeat units or a saturated $C_{10}$ or higher hydrocarbyl (meth)acrylate;
(f) 0–10% of a silica thixotrope; and
(g) 0.01–2% of a suitable photoinitiator, alone or in combination with an equivalent amount of a photosensitizer.

These compositions may further comprise conventional stabilizers, fillers, nonreactive diluents, coloring agents and the like in conventional amounts.

As mentioned above, the first component (a) of the compositions of the present invention is a radiation curable acrylic capped organic prepolymer resin. Exemplary of such resins there may be given the acrylated or (meth)acrylated polyester urethanes, acrylated or (meth) acrylated polyether urethanes, and acrylate or (meth)acrylate ester prepared by reaction of (meth)acrylic acid with a polyepoxide resin, a (meth)acrylated terminated butadiene polymer and the like. Such acrylic capped resins and their methods of preparation are disclosed in, for example, U.S. Pat. Nos. 4,574,138; 4,439,600; 4,380,613; 4,309,526; 4,295,909 and 4,018,851. Such materials are available from numerous sources including the Uvithane ® resins from Morton International, the CN oligomer resins from Sartomer Company and the EBECRYL ® resins from UCB Radcure, Inc.

Suitable diluent monomers (b) include monomers having single (meth)acrylate or vinyl groups such as tetrahydrofurfural (meth)acrylate, hydroxyethyl (meth)acrylate, hydroxypropyl (meth) acrylate, vinyl acetate, styrene, isobornyl acrylate, N-vinyl pyrrolidone, N-vinyl carbazole, etc. Preferably, the diluent monomer is selected from the group consisting of hydroxyethyl (meth)acrylate, hydroxy- propyl (meth)acrylate, isobornyl acrylate, and N-vinyl pyrrolidone.

Suitable monomers having plural (meth)acrylic functionality (c) include, for example, 1,3-butylene glycol diacrylate, diethylene glycol diacrylate, 1,6-hexandiol diacrylate, neopentyl glycol diacrylate, triethylene glycol diacrylate, tetraethylene glycol diacrylate, trimethylol propane ethoxylate triacrylate, pentaerythritol tetraacrylate, tripropylene glycol diacrylate, trimethylol propane triacrylate, ditrimethylol propane tetraacrylate, dipentaerythritol pentaacrylate, pentaerythritol triacrylate and their corresponding (meth)acrylate compounds. Especially preferred are the tri and higher polyacrylates, including, for example, trimethylolpropane triacrylate and dipentaerythritol pentacrylate. These polyfunctional compounds are especially useful in helping control and modify the modulus of the cured adhesive compositions.

Suitable non-reactive release agents employable in accordance with the present invention include fatty alcohols, alkoxylated fatty alcohols, fatty acid amides, fatty acid esters, metallic soaps, parrafin and polyethylene waxes and vinyl esters of unsaturated oils. Especially preferred are the vinyl esters of unsaturated oils such as vinyl stearate, vinyl palmitate, and mixtures of the same. The presence of these non-reactive release agents is critical in order to attain deblocking characteristics within a reasonable period of time.

As noted above, in addition to the foregoing, the compositions in accordance with the practice of the present invention may also optionally contain poly(alkyleneoxide) (meth)acrylates having three or more alkylene ether repeat units including, for example, polyethylene oxide (meth)acrylate, polyethylene oxide acrylate, polypropylene oxide (meth) acrylate, polypropylene oxide acrylate and the like, and/or saturated $C_{10}$ or higher hydrocarbyl (meth)acrylates such as lauryl (meth)acrylate, stearyl acrylate, stearyl (meth)acrylate and the like.

Additional constituents which may be employed in the compositions of the present invention include silica thixotropes (f), such as fumed silica, in amounts of 2–6% by weight. The fumed silica may be untreated or is preferably treated with for example hexamethylenedisilizane or polydimethylsiloxane. The presence of a thixotrope aids in preventing unwanted migration of the adhesive prior to cure.

Finally, the remaining critical constituent to the compositions of the present invention is the photoinitiator which may be employed alone or in combination with a photosensitizer. Suitable photoinitiators are any of those known to those skilled in the art for use with radiation or light (including visible and ultraviolet light) curable acrylate systems. Exemplary of such photoinitiators are acetophenone and its derivatives such as di- chloroacetophenone, trichloroacetophenone, dialkoxyacetophenone, 2,2-dimethoxy-2-phenylacetophenone and 4-dialkylaminoacetophenone; benzophenone and its derivatives such as 4,4'-bis(dimethylamino)benzophenone (Michler's ketone) and 4,4'-bis(diethylamine)benzophenone; benzil; benzoin and its derivatives such as benzoin alkyl ether; benzildimethylketal; benzoylbenzoate; alphaacyloxime esters; thioxanthone and its derivatives such as 2-chlorothioxanthone and diethylthioxanthone; azo-compounds such as azobisisobutyronitrile; benzoyl peroxide; camphoquinone; phosphine oxides such as diphenyl-2,4,6-trimethylbenzoylphosphine oxide and the like. Especially preferred photoinitiators include 1-benzoyl-cyclohexanol and diphenyl-2,4,6-trimethylbenzoylphosphine oxide. Other suitable photoinitiators will be readily recognised by those skilled in the art.

Suitable photosensitizers which may be used in combination with the photoinitiator include amine derivatives such as N-butylamine, di-N--butylamine, trimethylamine and triethylamine; tri-N-butylphosphene; allylthiourea and diethylaminoethyl (meth)acrylate.

In addition to the foregoing constituents, the formulations of the present invention may further comprise conventional amounts of stabilizers (e.g., quinones and hydroquinones), fillers, nonreactive diluents, coloring agents, plasticizers, antioxidants and the like. Generally, these constituents, their functions and the amounts by which they are incorporated would be well-recognized and known to those skilled in the art.

Compositions useful in the practice of the present invention include those disclosed in Drain et al. (U. S. Pat. No. 4,826,705) which is directed to radiation curable temporary solder masks. It was unexpected, however, that these materials would be suitable for use in the practice of the present invention inasmuch as they are therein described as having adhesive strength sufficiently high so as to resist debonding by solder, coating or plating materials during application and processing operations in the manufacture of electronic components and sufficiently low so as to be easily peeled from the substrate surface by hand or simple mechanical force.

Indeed, it has been found that the compositions of the present invention exhibit marked improvement in adhesive strength as compared to conventional pitches in the process of manufacturing lenses. Generally, the materials used in accordance with the practice of the present invention have about four times the strength and about eight times less distortion characteristics than conventional pitch resins. Such improvement in adhesive strength alone allows for the use of less material over a smaller surface area.

Surprisingly, the compositions of the present invention are also found to have much less shrinkage on curing, typically on the order of 3–4%, as compared to conventional UV curable acrylate adhesive compositions which generally have from 7–9% shrinkage. This low shrinkage characteristic may contribute to the low level of lens distortion.

The radiation curable adhesive having the composition described above is used to bond a lens or lens blank to a support member for subsequent processing. The bonded articles are exposed to the appropriate radiation, e.g., UV or visible light radiation, depending upon the selection of photoinitiators, at an appropriate time to initiate the polymerization and thereby secure the lens or lens blank to the support member. Ultraviolet exposure may be effected by utilizing ultraviolet rays of about 200 to about 450 nm generated by an exposing device such as a high-pressure mercury lamp or a metal-halide lamp. The exact intensity, duration and wavelength will be dependent upon the specific photinitiator or photoinitiator/photosensitizer system employed. Generally, an exposure of about 5 seconds to 5 minutes or more, preferably from about 30 seconds to about 90 seconds, at 30 mW/cm$^2$ at 365 nm will be sufficient to polymerize the photopolymerizable monomer(s) and thereby harden the adhesive. It is also to be noted that if desired, one can initially fixture the lens or lens blank to the support member by providing a very brief exposure to UV light (or whatever form of radiation is being employed), followed by longer duration exposure for full cure. This sequence of steps allows for the easy removal or realignment of the lens or lens blank, if needed, prior to full adherence.

The secured lens or lens blank is then subjected to working such as machining, polishing and/or any other necessary treatments, so as to form a commercially usable lens. Such lenses may be used for ophthalmic, telescopic, microscopic, etc., applications.

Referring to FIG. 1, there is depicted a process for preparing a lens from a raw lens blank, generally a glass cylinder, using the above described radiation curable adhesive. Reference 1 designates the lens block or support member (hereinafter lens block) to which the lens blank 3 will be bonded. The adhesive 2 is applied to the bonding surface of the lens block (the annular ring surface in the case of an annular ring design block or into the well of a button design block) and the lens blank 3 thereafter seated upon the adhesive coated bonding surface. The actual seating of the lens blank on the lens block may be aided by the use of an appropriate alignment sleeve (not shown). Thereafter, the assembled unit is exposed to radiation (e.g., UV light) for about 30 seconds or more so as to fixture the lens blank to the lens block. The assembly is then checked to assure that the lens blank is properly aligned or, if an alignment sleeve is used, the alignment sleeve is removed and the assembled device is exposed to the radiation for an additional 60 seconds or more to fully cure the adhesive. Thereafter, the cured assembly may be subject to working whereby the lens blank is either ground, polished or given whatever treatment may be necessary. Following working of the exposed surface of the lens blank, the lens assembly then is placed in an appropriate debonding solution, for example water and detergent, acetone, and the like, for a sufficient period of time to debond the lens piece from the lens block. The process may be terminated at this point if only the one surface is subject to working.

On the other hand, should it be desired or necessary to work on the opposite surface of the lens or lens blank, then the lens blank is inverted and, as described above, bonded to the lens block using the adhesive in accordance with the practice of the present invention. Optionally, it may be desirable to first coat the worked surface of the lens element with an appropriate protective coating 4. Suitable protective coatings include polyvinyl acetate, mixtures of polyvinyl acetate and nitrocellulose resins, acrylic latexes and the like and are described in Cox et al. (U.S. Pat. No. 3,404,488), hereby incorporated by reference.

As before, the assembly is then subjected to an initial irradiation to fixture the partially worked lens blank to the lens block to assure proper alignment. Thereafter, the assembly is again exposed to radiation for a further period of time to fully cure the adhesive. Finally, after working, the assembled device is once again subject to deblocking treatment so as to disassemble the assembly and recover the lens and the lens block.

Deblocking is typically accomplished by immersing the bonded assembly in one or more of the following solutions: a water/glycol solution, a water detergent solution, acetone and the like. Deblocking times may be as little as one minute to as much as one hour or more. It is preferred, however, to maintain a deblocking time of less than about forty minutes, preferably less than about thirty minutes. In order to accelerate deblocking, it is preferred that the temperature of the solution, especially with respect to the aqueous based solutions, be maintained at temperatures from room temperature up to, preferably, about 80° C.

The instant invention will be better illustrated by reference to the following nonlimiting examples. It is understood that the skilled person can readily formulate other radiation curable compositions or modify the recited formulations for use in accordance with the inventive method with reference to his own formulation skills and to the teachings and desired property parameters set forth herein. Further, when used herein, the terms "part(s)" and "%" (percentage) are on a weight basis, namely parts by weight and % by weight, respectively.

In the following examples, unless otherwise indicated, all of the tested formulations were comprised of the same base constituents in essentially the same ratios. This "base" formulation is hereinafter referred to as Base A and comprises those constituents set forth in Table 1 in essentially the amounts specified.

TABLE 1

| BASE A | |
|---|---|
| Material | % (wt) |
| polyester urethane, acrylate terminated[1] | 48.01 |
| poly(glycol adipate) urethane, acrylate terminated[2] | 15.48 |
| poly(propyleneglycol) monomethacrylate | 15.01 |
| hydroxyethyl methacrylate | 15.00 |
| trimethylolpropane ethoxylate triacrylate | 2.34 |
| photoinitiator 1-benzoyl cyclohexanol | 3.34 |
| red dye | 0.03 |
| stabilizer[3] | 0.79 |

[1]Uvithane 782 from Morton International
[2]Uvithane 783 from Morton International
[3]Standard UV acrylate stabilizer package including a free radical stabilizer and metal chelating agents.

These formulations were prepared by adding the acrylate terminated prepolymers to a vessel in a hot water bath at about 50° C. Once the acrylate terminated prepolymers were melted, the diluent monomers were then incorporated in order to dissolve the prepolymer in the diluent monomer. Thereafter, the remaining constituents were added. Finally, the photoinitiator (in this case a UV photoinitiator) was added to the formulation under proper processing techniques so as to prevent any premature activation of the photoinitiator and the mixture stirred at 50° C. for approximately one hour in order to solubilize the photoinitiator and to assure that the remaining soluble ingredients were similarly solubilized. Thereafter, the mixture was brought to room temperature and stored under appropriate conditions.

EXAMPLES E1-E4; COMPARATIVE EXAMPLE CE1

Various compositions within and outside the scope of the present invention were prepared in order to evaluate their adhesive strength for bonding a glass element (lens blank) to a lens block. The specific formulations were as set forth in Table 2.

In each test, the glass samples and the steel chuck (in this instance a Kennametal Chuck having an annular ring design was used) were cleaned with acetone and isopropyl alcohol. Thereafter, approximately 0.1 ml of each adhesive was applied in a circular fashion to the inside diameter of the annular ring, the bead of adhesive having a diameter of no more than a millimeter. The chuck was then inserted into an alignment sleeve and the lens placed on top. This construction was then placed under a UV light source, using an intensity of 30 mw/cm$^2$ at 365 nm (Loctite Zeta TM 7400 UV light source) for 30 seconds in order to fixture the lens to the chuck. The alignment sleeve was then removed and the lens/chuck assembly subjected to an additional 60 seconds of UV irradiation. Torque measurements of the cured assemblies were then made to determine the strength of the bond. A comparative assembly was made using the traditional pitch button method (height of pitch button 5.0 mm). The results of these tests were as shown in Table 2. As can be seen, the compositions of the present invention had a marked improvement in relative torque strength as compared to the traditional pitch materials.

In addition to the torque testing, the lens/block assemblies were also tested for surface deformation. In this instance, three different lens configurations shown in FIG. 2a, b and c, having aspect ratios (i.e., diameter-to-thickness ratios) of 5:1, 10:1 and 10:1, respectively, were evaluated in the blocked and unblocked positions to determine the amount of surface deformation caused by this blocking technique. All parts were measured using a Zygo Mark II Interferometer with a Phase Shifting attachment (tilt and focus were substracted). The average ΔRMS for the four different adhesives was 0.02 waves ΔRMS. These values are indicative of almost no surface deformation. Furthermore, as demonstrated in Table 3 (employing the lens configuration of FIG. 2c), as the level of the vinyl ester

TABLE 2

| composition (parts) | E1 | E2 | E3 | E4 | CE1 |
|---|---|---|---|---|---|
| Base A | 99 | 98 | 97.5 | 97 | — |
| vinyl stearate* | 1 | 2 | 2.5 | 3 | — |
| pitch | — | — | — | — | 100 |
| performance | | | | | |
| bond area (mm$^2$) | 47 | 47 | 47 | 47 | 1256 |
| torque (in. lbs.) | 58 | 50 | 45 | 35 | 74.8 |
| strength (in. lbs./mm$^2$) | 1.23 | 1.06 | 0.96 | 0.74 | 0.06 |

*commercial vinyl stearate comprising 40-48% vinyl stearate and 60-52% vinyl palmitate.

of the saturated oil, acid increases, what little surface deformation was noted increasingly diminished.

TABLE 3

| Formulation | ΔRMS |
|---|---|
| E1 | 0.031 |
| E2 | 0.022 |
| E3 | 0.022 |
| E4 | 0.012 |

EXAMPLES E5-E9; COMPARATIVE EXAMPLE CE2

A second series of adhesive compositions within and outside the scope of the compositions of the present invention was prepared for evaluation as to their debondability under various circumstances. The formulations of these compositions were as indicated in Table 4. For this test, assemblies comprising glass and steel lapshears (1" width) were employed as a model of the lens/block assembly. The lapshears were cleaned with isopropyl alcohol and then one to two drops of the adhesive were applied near the end of one lapshear. The glass lapshear was then bonded (0 gap with ½" overlap) to the steel lapshear and the assembly irradiated with a low energy UV source (30 mW/cm$^2$ at 365 nm) to cure the adhesive. Thereafter, the assemblies were placed in either a water/polypropylene glycol solution (1:1) or acetone and the time noted until the lapshears separated. The results obtained were as presented in Table 4. As indicated, compositions without the presence of the vinyl ester of the oil acid resulted in excessively long deblocking times.

TABLE 4

| composition (parts) | E5 | E6 | E7 | E8 | E9 | CE2 |
|---|---|---|---|---|---|---|
| Base A | 99 | 98 | 97.5 | 97 | 90 | 100 |
| vinyl stearate* | 1 | 2 | 2.5 | 3 | 6 | — |
| fumed silica | — | — | — | — | 4.2 | — |
| deblocking times (min.) in | | | | | | |
| water/glycol (85-92° C.) | 60 | 95 | 55 | 30 | 15 | 60 |
| acetone (71° F.) | 100 | 75 | 55 | 40 | 55 | 105 |

*commercial vinyl stearate comprising 40-48% vinyl stearate and 60-52% vinyl palmitate.

EXAMPLE E10

Figure 2:
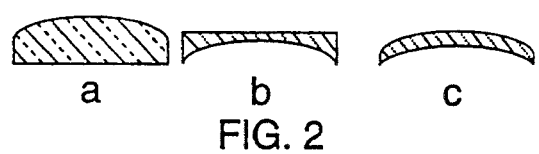
FIG. 2 is an illustration of three configurations of lens elements tested in accordance with the present specification.
Figure 3:
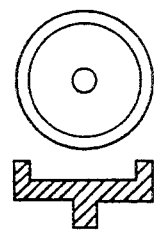
FIG. 3 is an illustration of the top and side views of a chuck or support member having an annular ring design.

A further testing of the deblocking characteristics was carried out on a lens/block assembly employing a lens of the type shown in FIG. 2c. The assembly was prepared in accordance with the procedures set forth in Example 1 above and was then placed in a water/polypropylene glycol solution (1:1) which was maintained at various temperatures. The results were as presented in Table 5. These results demonstrate that elevated temperatures will accelerate debonding of the adhesive in the instant inventive method.

TABLE 5

| Temperature (°C.) | 50 | 60 | 70 | 80 |
|---|---|---|---|---|
| Time (min.) | 96 | 60 | 46 | 19 |

Although lens/block assemblies assembled with pitch are normally deblocked within 30 minutes or so following refrigeration at −20° C., the temperature variations to which the lenses are exposed with the use of pitch (greater than 100° C. for adherence and approximately −20° C. for debonding) are likely to cause surface defects and springing in the lens. Furthermore, once the lens is removed from the pitch, any residual pitch on the lens surface must be removed by either placing the lens in a solvent degreaser or soaked in acetone until the residue is removed. Thus, the simplified chemistry and utility of the compositions of the present invention more than outweigh the increased debonding time encountered with the same.

Finally, it was also noted that the surface area of the bond itself affected debonding time. Thus, those lens elements having plano surfaces relative to the annular ring tended to have longer debonding times as compared to those surfaces which only make a slight contact with the annular ring.

EXAMPLE E11

In addition to the foregoing tests, several glasses, namely K7, F7, SK7, BK7, Lak9, SF15 and SF2, were bonded and debonded using the adhesive compositions of the present invention. The debonded surfaces were thereafter evaluated to determine whether any evidence of staining and/or striping was noted. Generally, no such defects were found when the samples were scanned using a Nomarski Interference Phase Contrast Microscope with magnification of 250X.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for bonding a lens blank to a lens block for subsequent working, said method comprising the steps of:
   (a) applying an adhesive material to the bonding surface of a lens block, said adhesive material comprising from about 45 to about 80% by weight of an acrylic capped organic prepolymer resin terminated at both ends with acrylic functionality, from about 5 to about 35% by weight of a monofunctional ethylenically unsaturated diluent monomer, up to about 6% by weight of a non-reactive releasing agent and from about 0.001 to about 5% by weight of a photoinitiator and wherein the acrylic capped organic prepolymer resin is selected from the group consisting of (meth)acrylated urethane, (meth)acrylated polyester urethane (meth)acrylated polyepoxide, (meth)acrylated poly(alkyleneoxide), (meth)acrylated polybutadiene and mixtures thereof;
   (b) placing the lens blank upon the adhesive coated surface and aligning the same; and
   (c) allowing or enabling said adhesive to bond the lens blank to the lens block.

2. The method of claim 1 wherein the radiation curable adhesive comprises from about 45 to about 80% by weight of the acrylic capped organic prepolymer resin, from about 5 to about 35% by weight of the mono-functional ethylenically unsaturated diluent monomer, up to about 6% by weight of the non-reactive releasing agent and from about 0.001 to about 4% by weight of a photoinitiator and wherein the acrylic capped organic prepolymer resin is selected from the group consisting of (meth)acylated urethane, (meth)acrylated polyester urethane, (meth)acrylated polyepoxide, (meth)acrylated poly(alkyleneoxide), (meth) acrylated polybutadiene and mixtures thereof.

3. The method of claim 1 wherein the adhesive material comprises:
   (a) 50–70% by weight of the acrylic capped organic prepolymer resin;
   (b) 10–30% by weight of the monofunctional ethylenically unsaturated diluent monomer;
   (c) 0–3% by weight of a monomer having plural (meth)acrylic functionalities;
   (d) 0.5–5% by weight of at least one vinyl ester of a saturated oil acid as the non-reactive releasing agent;
   (e) 0–20% by weight of a poly(alyleneoxide) (meth)acrylate having three or more alkyleneoxide repeat units or a saturated $C_{10}$ or higher hydrocarbyl (meth)acrylate;
   (f) 0–10% by weight of a silica thixotrope; and
   (g) 0.01–2% by weight of a suitable photoinitiator, alone or in combination with an equivalent amount of a photosensitizer.

4. The method of claim 1 wherein the non-reactive releasing agent is selected from the group consisting of fatty alcohols, alkoylated fatty alcohols, fatty acid amides, fatty acid esters, metallic soaps, paraffin and polyethylene waxes and vinyl esters of saturated oils.

5. The method of claim 4 wherein the non-reactive releasing agent is a vinyl ester of a saturated oil.

6. The method of claim 5 wherein the vinyl ester is selected from the group consisting of vinyl stearate, vinyl palmitate and mixtures thereof.

7. The method of claim 1 wherein the acrylic capped organic prepolymer resin comprises one or more (meth)acrylated polyester urethanes.

8. A process of producing a lens comprising the steps of:
   (a) bonding a lens blank to a support member with a radiation curable adhesive, said adhesive comprising from about 45 to about 80% by weight of an axcrylic capped organic prepolymer resin terminated at both ends with acrylic functionality, from about 5 to about 35% by weight of a monofunctional ethylenically unsaturated diluent monomer, up to about 6% by weight of a non-reactive releasing agent and from about 0.001 to about 5% by weight of a photoinitiator and wherein the acrylic capped organic prepolymer resin terminated at both ends with the acrylic functionality is selected from the group consisting of (meth)acrylated urethane, (meth)acrylated polyester urethane, (meth)acrylated polyepoxide, (meth)acrylated poly(alkyleneoxide), (meth)acrylated polybutadiene and mixtures thereof;
   (b) exposing the bonded lens blank and support member to radiation so as to cure the adhesive;
   (c) subjecting the lens blank to working and/or treatment so as to form the lens blank into a desired lens; and
   (d) separating the lens from the support member.

9. The process of claim 8 wherein the radiation curable adhesive comprises from about 45 to about 80% by weight of the acrylic capped organic prepolymer resin, from about 5 to about 35% by weight of the monofunctional ethylenically unsaturated diluent monomer, up to about 6% by weight of the non-reactive releasing agent and from about 0.001 to about 4% by weight of a photoinitiator and wherein the acrylic capped organic prepolymer resin is selected from the group consisting of (meth)acylated urethane, (meth)acrylated polyester urethane, (meth)acrylated polyepoxide, (meth)acrylated poly(alkyleneoxide), (meth)acrylated polybutadiene and mixtures thereof.

10. The method of claim 8 wherein the adhesive composition comprises:
    (a) 50–70% of at least one (meth)acrylated urethane, (meth)acrylated polyester urethane, (meth)a- crylated polyepoxide, (meth)acrylated poly(aklyleneoxide), (meth)acrylated polybutadiene or mixtures thereof;

(b) 10-30% of a monofunctional ethylenically unsaturated diluent monomer;

(c) 0-3% of a monomer having plural (meth)acrylic functionalities;

(d) 0.5-5% of at least one vinyl ester of a saturated oil acid as the non-reactive releasing agent;

(e) 0-20% of a poly(alkyleneoxide) (meth)acrylate having three or more alkyleneoxide repeat units or a saturated $C_{10}$ or higher hydrocarbyl (meth)acrylate;

(f) 0-10% of a silica thixotrope; and (g) 0.001-5% of a suitable photoinitiator, alone or in combination with an equivalent amount of a photosensitizer.

11. The method of claim 8 wherein the non-reactive releasing agent is selected from the group consisting of fatty alcohols, alkoxylated fatty alcohols, fatty acid amides, fatty acid esters, metallic soaps, paraffin and polyethylene waxes and vinyl esters of saturated oils.

12. The method of claim 11 wherein the non-reactive releasing agent is a vinyl ester of a saturated oil.

13. The method of claim 12 wherein the vinyl ester of the saturated oil is selected from the group consisting of vinyl stearate, vinyl palmitate and mixtures thereof.

14. The method of claim 8 wherein the acrylic capped organic prepolmer resin comprises one or more (meth)acrylated polyester urethanes.

15. The process of claim 8 wherein the lens blank is bonded to the support member by first applying the radiation curable adhesive to the support member, placing the lens blank on the adhesive coated surface of the support member and fixturing the lens to the lens block by exposing the same to radiation for a brief period of time so as to fixture the lens and lens block assembly.

16. The process of claim 15 wherein following the application of the adhesive to the lens block, an alignment sleeve is placed on the assembly prior to placement of the lens block on the same.

17. The process of claim 15 wherein the lens blank/lens block assembly is exposed to irradiation for up to 30 seconds.

18. The process of claim 8 wherein the step of separating the lens from the lens block comprising treating the bonded lens and lens block assembly with a polar solvent.

19. The process as set forth in claim 8 wherein the step of separating the lens from the lens block comprises treating the bonded lens and lens block assembly with an aqueous solution.

20. The process of claim 19 wherein the aqueous solution consists of water or a water/glycol mixture.

21. The method of claim 8 wherein the radiation curable adhesive is an UV light curable adhesive and the radiation to which it is exposed for curing is UV radiation.

22. The method of claim 8 wherein the radiation curable adhesive is a visible light curable adhesive and the radiation to which it is exposed is visible light.

* * * * *